United States Patent [19]

Rydquist et al.

[11] Patent Number: 4,459,808
[45] Date of Patent: Jul. 17, 1984

[54] SYSTEM FOR CONTROLLING THE CHARGE AIR PRESSURE IN A TURBO-CHARGED COMBUSTION ENGINE

[75] Inventors: Jan E. Rydquist, Billdal; Lars Sandberg, Göteborg; Ralf Wallin, Lindome, all of Sweden

[73] Assignee: AB Volvo, Göteborg, Sweden

[21] Appl. No.: 348,722

[22] Filed: Feb. 16, 1982

[30] Foreign Application Priority Data

Feb. 19, 1981 [SE] Sweden ............................... 8101119

[51] Int. Cl.³ .............................................. F02B 37/12
[52] U.S. Cl. .................................................... 60/602
[58] Field of Search ................ 60/600, 601, 602, 603, 60/611; 123/564

[56] References Cited

U.S. PATENT DOCUMENTS

| | | | |
|---|---|---|---|
| 3,233,403 | 2/1966 | MacInnes et al. | 60/600 |
| 4,005,579 | 2/1977 | Lloyd | 60/602 |
| 4,322,948 | 4/1982 | Emmenthal et al. | 60/602 |
| 4,372,119 | 2/1983 | Gillbrand et al. | 60/600 |

*Primary Examiner*—Michael Koczo
*Attorney, Agent, or Firm*—Young & Thompson

[57] ABSTRACT

A system for achieving temporary increase in performance in a turbo-charged combustion engine comprises a microprocessor in which there are stored a value of the maximum permissible charge pressure at constant load and a higher value of the maximum permissible charge pressure at increasing load. The processor senses the charge pressure and is connected to means which sense the rate of opening of the throttle. At a certain rate of opening, the processor permits an increase in the charge pressure to the higher pressure and thereafter effects timed reduction of the charge pressure to the maximum permissible pressure at constant load.

7 Claims, 3 Drawing Figures

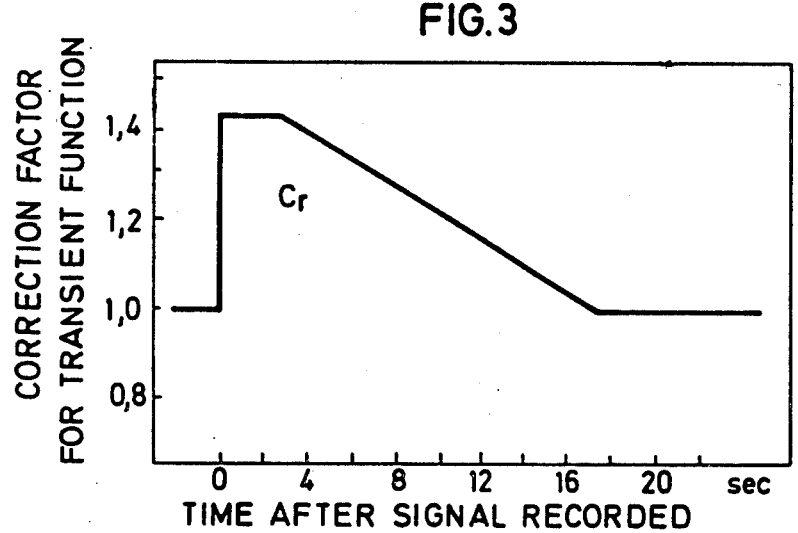

SYSTEM FOR CONTROLLING THE CHARGE AIR PRESSURE IN A TURBO-CHARGED COMBUSTION ENGINE

The present invention relates to a system for controlling the charge air pressure in a turbo-charged combustion engine, comprising control means which are disposed to limit the charged pressure to a predetermined level.

In setting turbo-charged engines, the supercharging is limited by the tendency of the engine to go into abnormal combustion, so-called knocking. At a given compression ratio and a given fuel quality, there is thus a limited highest possible charge pressure for knock-free operation. It follows from this that the maximum performance of the engine is definitely determined by knocking throughout the engine speed range.

Normally however, in vehicles the engine is only fully loaded for short periods of time, usually during acceleration and for passing other vehicles. At other times (except for pure high-speed driving) the engine works essentially at partial load. Acceleration will, however, involve essentially transient loading of the engine, during which the settings for steady state operation are not always the most favourable. In addition, there are somewhat different operating conditions for the engine during transient load than with steady state operation, e.g. differencies in material temperatures and fluid temperatures, different ratios for the inlet air etc.

The purpose of the present invention is to achieve a system of the type described in the introduction, which takes into account the above-mentioned differences and makes it possible to, even with a relatively small engine designed for good fuel economy, achieve high practical (transient) performances.

This is achieved according to the invention by virtue of the fact that said control means are coordinated with means which, when there is an increase in load above a certain rate (e.g. acceleration when passing), actuate the control means to permit an increase in the charge pressure to a maximum level over the predetermined level and, within a certain period, to actuate the control means to reduce the charge pressure to the predetermined level.

The invention is based on the insight that transient supercharging levels substantially above the level possible for steady state operation, only lead slowly to the occurrence of knocking, which is caused, inter alia, by delays before the temperatures of the inlet air, fluids, materials and combustion chamber reach higher values. Short-term controlled increase of the supercharging level above the level for steady state operation thus achieves a temporary increase of engine performance to increase acceleration for example, to shorten the time to pass another vehicle.

The invention will be described in more detail below with reference to the examples shown in the accompanying drawings.

FIG. 3 shows the correction factor for the transient function, plotted against time.

Figure 1:
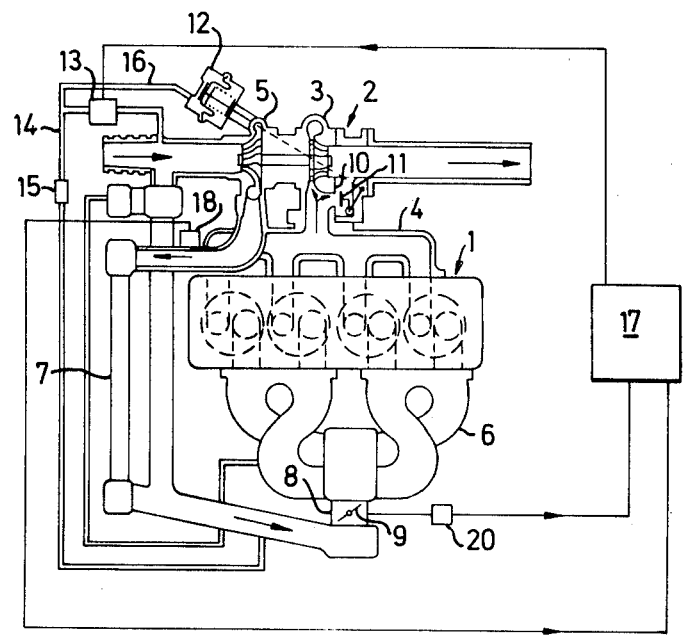
FIG. 1 shows schematically a turbo-charged combustion engine with a system according to the invention for controlling the charge pressure.

The engine 1 shown in FIG. 1 is a four-cylinder Otto engine with a turbo-compressor unit 2 (known per se), comprising a turbine portion 3 communicating with the engine exhaust manifold 4 and a compressor portion 5 communicating with the engine intake manifold 6 via a charge air cooler 7 of air-air type and a throttle body 8 containing the engine throttle 9. The gas flow through the turbine 3 is regulated in a known manner with the aid of a waste gate 11 coupled into a shunt pipe 10 which can be actuated by a pneumatic operating mechanism 12 and which when closed directs the entire gas flow through the turbine. The pressure in the operating mechanism 12 and thus the setting of the waste gate is determined by an electromagnetic frequency valve 13 in a line 14 which, via a calibrated constriction 15, connects the suction and pressure sides of the compressor to each other and from which a line 16 branches to the operating mechanism 12.

The valve 13 is controlled by a microprocessor 17 to which signals are fed representing charging air pressure. The input signals to the microprocessor are obtained from a sensor 18 which can be a piezoresistive transductor. The processor is also coupled to a throttle position-sensing potentiometer 20, and with the aid of signals therefrom can compute the rate of opening or closing of the throttle, e.g. the rate of change in the throttle position. In the processor there are stored a value of the maximum permissible charge pressure at steady state operation and a higher value of the maximum permissible charge pressure at transient load, e.g. during acceleration when passing. The processor is programmed, at a certain predetermined minimum rate of load increase, represented by a certain rate of throttle opening, e.g. $1°/ms$, to multiply the maximum steady state charge pressure with a correction factor $C_r$, e.g. 1.45, which means that the transient pressure can be up to 45% greater than the first-mentioned pressure, and to thereafter, within a specified time period of about 20 seconds for example, gradually reduce the limit for permissible charge pressure to the level at steady state operation. In order to prevent thermal overload due to closely spaced transient superchargings, the processor is also preferably programmed to prevent, after reducing the pressure to the steady state level, another transient supercharging during a minimum period of about 4 seconds for example. Furthermore, the processor can be programmed to actuate the transient function only after an increase of the opening angle of the throttle of at least 15°, to eliminate the effect of small movements of the throttle caused by engine vibrations or movements of the vehicle.

Figure 2:
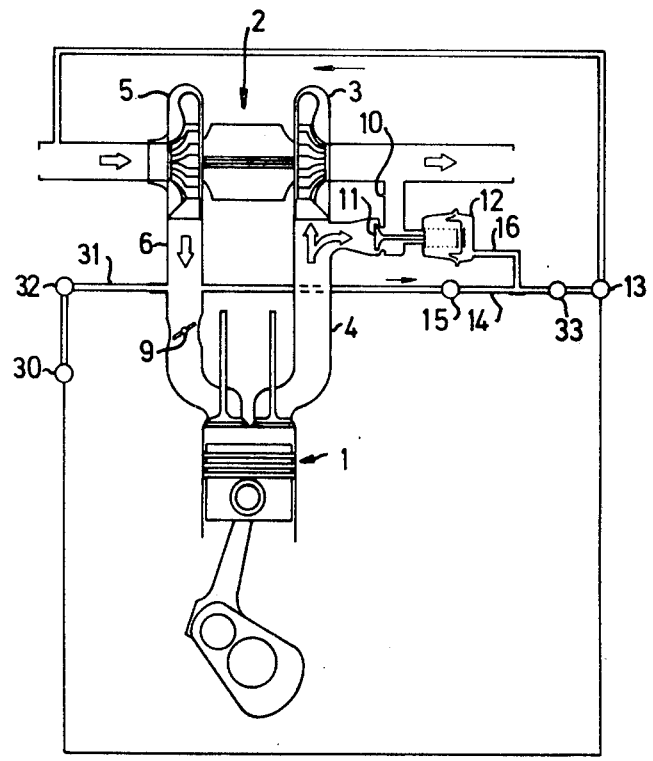
FIG. 2 shows a schematic drawing of the system according to the invention in a modified simplified embodiment.

FIG. 2 shows the system according to the invention in a modified embodiment, with parts corresponding to the system in FIG. 1 being labelled with the same reference numerals where applicable. The microprocessor has been replaced by a pressure switch 30 in a line 31 which communicates with the engine inlet pipe 6. Between the pressure switch 30 and the inlet pipe 6, there is a delay device 32 which can be a calibrated constriction with a one-way function, providing a constricted opening in the direction towards the pressure switch 30 but unconstricted opening in the opposite direction. In the connection between the inlet pipe 6 and the operating mechanism 12 of the waste gate 11 there is a delay device being a calibrated constriction 15 in the line 14. Furthermore, there is a constriction 33 in front of the valve 13.

During load increase (acceleration) the transient function is achieved by a delay being effected by the constriction 32 from the point in time when the pressure in the inlet pipe reaches the trigger pressure of the pressure switch 30 to the moment when this pressure has been built up in the switch. During this time interval, the pressure increases in the inlet pipe above the permitted maximum steady state value. As soon as the pressure switch is actuated, the valve 13 closes, whereupon the waste gate begins to open to reduce the charge pressure to the level for maximum permissible pressure at steady state operation. The size and duration of this supercharging is determined by the size of the constrictions 15 and 33. The time of the closing of the valve is determined by the calibration of the constriction 32. As an alternative to the constriction 32, an engine throttle-actuated time relay can be used, which can be activated for example when the accelerator pedal is pressed to the floor.

In tests made with a conventional turbo-charged engine supplemented with the system according to the invention, the waste gate operating mechanism 12 was set to open the gate at 0.67 bar boost pressure. The switching pressure of the pressure switch 30 was set at 0.55 bar boost pressure. The constrictions 32, 15 and 13 were set so that the maximum boost at acceleration was 0.8 bar and the period to closing of the valve 13 was about 10 seconds.

To achieve the transient function described above, involving a temporary raising of the maximum charge pressure above the maximum pressure at steady state, a correction factor $C_r$ was selected as a function of time as shown in the curve in FIG. 3. The input signal representing the rate of opening of the throttle was obtained from the potentiometer 20 sensing the throttle position. It can be coupled to any means at all which produces an increase in load, e.g. the throttle arm in the injection pump of a diesel engine. The processor was programmed to multiply the command value $P_n$ by the transient factor $C_r$ at throttle opening speeds exceeding 1°/ms and at an absolute increase of the opening angle of at least 15°, the latter to avoid sensing engine vibrations or vehicle movements which otherwise could trigger the transient function. To prevent thermal overloading, the processor was programmed, after reducing the pressure to the command value, to prevent renewed transient supercharging during a certain minimum period, e.g. circa 4 seconds.

What we claim is:

1. System for controlling the charge air pressure in a turbo-charged combustion engine, comprising control means disposed to limit the charge air pressure to a predetermined level, and means responsive to an increase in load at a certain rate, to actuate the control means to permit an increase in the charge pressure to a maximum level over said predetermined level and, within a certain period thereafter, to actuate the control means to reduce the charge pressure to the predetermined level.

2. System according to claim 1, in which the control means comprise a waste gate arranged in a by-pass past the turbine of the turbo-compressor, characterized in that the means cooperating with the control means are disposed to control an operating mechanism for the waste gate so that the waste gate, when there is an increase in load at a certain rate, opens at a charge pressure which is higher than the maximum permitted pressure at constant load.

3. System according to claim 1, characterized in that the means cooperating with the control means comprise a microprocessor which controls an electromagnetic valve, which in turn controls the operating mechanism of the waste gate, that there are stored in the processor a value of the maximum permissible charge air pressure at constant load and a higher value of the maximum permissible charge air pressure when there is increase in load, and that the processor is connected to means producing an increase in load, e.g. the engine throttle, and is disposed, upon registering a certain rate of change therein, to permit an increase of the charge air pressure to said higher pressure and to thereafter effect timed reduction of the pressure to the maximum permissible pressure at constant load.

4. System according to claim 3, characterized in that the microprocessor is programmed, after reducing the pressure to the maximum pressure at constant load, to permit another increase to the higher pressure only after a predetermined period of time.

5. System according to claim 2, characterized in that the means cooperating with the control means comprise a pressure switch loaded by the charge pressure on the inlet side of the engine, said switch, at a predetermined pressure, actuating the waste gate to open, a delay means being arranged between the inlet side of the engine and the pressure switch to achieve a time interval dependent on the rate of pressure increase in the engine inlet between the point in time when the charge pressure has reached said predetermined pressure and the point in time at which the pressure switch is actuated.

6. System according to claim 5, characterized in that additional delay means are arranged to achieve a time interval between the point in time of actuation of the pressure switch and the point in time for opening the waste gate.

7. System according to claim 5, characterized in that the delay means are pneumatic constrictions.

* * * * *